US009923356B2

(12) United States Patent
Byczkiewicz

(10) Patent No.: US 9,923,356 B2
(45) Date of Patent: Mar. 20, 2018

(54) CABLE BREAKOUT WITH INTEGRATED STRAIN RELIEF

(71) Applicant: Molex, LLC, Lisle, IL (US)

(72) Inventor: Barbara Byczkiewicz, Woburn, MA (US)

(73) Assignee: Molex, LLC, Lisle, IL (US)

( * ) Notice: Subject to any disclaimer, the term of this patent is extended or adjusted under 35 U.S.C. 154(b) by 731 days.

(21) Appl. No.: 14/248,513

(22) Filed: Apr. 9, 2014

(65) Prior Publication Data

US 2015/0295394 A1    Oct. 15, 2015

(51) Int. Cl.
*H02G 15/113*    (2006.01)
*H02G 15/117*    (2006.01)

(52) U.S. Cl.
CPC ......... *H02G 15/113* (2013.01); *H02G 15/117* (2013.01)

(58) Field of Classification Search
USPC ........... 174/22 R, 77 R, 76, 92, 20; 439/404, 439/620.08
See application file for complete search history.

(56) References Cited

U.S. PATENT DOCUMENTS

| | | | | |
|---|---|---|---|---|
| 2,962,542 | A * | 11/1960 | Witt ..................... | H02G 15/113 174/20 |
| 5,569,882 | A * | 10/1996 | Yokoyama ............ | H02G 15/18 174/138 F |
| 8,324,502 | B2 * | 12/2012 | Kameda ................ | H02G 15/24 156/53 |
| 2002/0061676 | A1 * | 5/2002 | Kameyama .......... | H01R 4/2429 439/404 |
| 2005/0181660 | A1 * | 8/2005 | Milette ................ | H01R 4/2404 439/404 |
| 2009/0065236 | A1 * | 3/2009 | Taylor .................... | H02G 15/24 174/22 R |
| 2011/0278043 | A1 * | 11/2011 | Ueda .................... | H01B 7/1895 174/115 |

FOREIGN PATENT DOCUMENTS

| | | | |
|---|---|---|---|
| CN | 2599814 Y | 1/2004 | |
| CN | 200969435 Y | 10/2007 | |
| EP | 2086083 A1 * | 8/2009 | ........... H02G 15/007 |

* cited by examiner

*Primary Examiner* — William H Mayo, III
*Assistant Examiner* — Krystal Robinson
(74) *Attorney, Agent, or Firm* — Jeffrey K. Jacobs

(57) ABSTRACT

A cable breakout assembly includes a protective housing with a series of cable cradles, each of which accommodates a cable or wire in the cable transition area. The cable cradles have inwardly facing stop surfaces and stop members are applied to the exterior surfaces of the cables proximate to the cable cradles. The stop members encircle the cables and define a shoulder or stop surface in opposition to the stop surfaces of the cable cradles. The two stop surfaces confront each other and are configured to help to provide an integrated strain relief to the cable transition area.

16 Claims, 5 Drawing Sheets

CABLE BREAKOUT WITH INTEGRATED STRAIN RELIEF

BACKGROUND OF THE PRESENT DISCLOSURE

The Present Disclosure relates generally to multi-wire cables and more particularly, to an improved cable breakout construction at the area where the wires exit the trunk cable, and which is provided with an integrated strain relief.

In newer high speed cable applications, such as QSFP (Quad Small Form Factor Pluggable), an installer takes a multi-wire cable, opens an end of it and exposes a preselected length of each of the internal wires to create a cable breakout with a plurality of wire free ends, and in QSFP applications, typically four wire free ends will be formed. This breakout from one trunk cable to the multiple wire SFP (Small Form Factor Pluggable) breakout cables occurs in a transition zone. It is important to provide some sort of strain relief for such a breakout in order to prevent the wires from being damaged when connected to their respective connectors.

The most common way in which to provide strain relief is to provide a mold into which the breakout is placed and a plastic resin is molded over and around the open end of the trunk cable, as well as the near portions of the SFP breakout cables. However, this requires careful labor so that the trunk cable and breakout cables must be properly oriented, and if misalignment occurs, some of the wires of the breakout cables may be exposed and damaged in the overmolding process or afterwards when stress is placed on them during the connection phase. If any issue occurs to either the trunk cable or the breakout cables that results in detriment to the integrity of these cables, the entire assembly must then be scrapped, which is an unacceptable solution. Accordingly, a need exists for an improved cable-wire transition with means for providing strain relief to the cable and wires.

The Present Disclosure is therefore directed to an improved breakout of SFP breakout cables from a trunk cable that is particularly suitable for use in QSFP applications.

SUMMARY OF THE PRESENT DISCLOSURE

Accordingly, there is provided an improved breakout for a QSFP cable that contains a plurality of smaller cables therein. The breakout has a strain relief aspect integrated with it that is encompassed by a protective housing and the strain relief acts to prevent the trunk and breakout cables from being pulled out of the housing during ordinary use of the cables.

In accordance with an embodiment as described in the following Present Disclosure, a multi-wire trunk cable, preferably one of the QSFP type is provided. Such a cable will incorporate four smaller cables each of which contains at least one wire pair, and preferably two wire pairs. The outer insulation of the trunk cable is cut to define a breakout end of the trunk cable to thereby expose the four SFP cables. The free ends of the breakout cables are configured for termination to a SFP style connector and a protective housing is provided that encloses the breakout area.

The housing is preferably formed from two pieces, which cooperatively define a hollow interior of the housing. The housing has a triangular-shaped configuration so they is can accommodate the fan-like arrangement of the breakout cables at the trunk cable free end. The housing further has two ends, preferably arranged at opposite ends. One of the housing ends includes a first exit opening that accommodates the body of the trunk cable therein and the other end includes a plurality of second exit openings, each of which accommodate a body of a single associated breakout cables. In order to capture the cable in place within the housing and to prevent the wires from being pulled too far out of the housing, a second, outer layer is provided on both the breakout cables and the trunk cable. This second layer can take the form of an additional layer of insulative, or an extent of heat-shrink tubing that may be further provided with adhesive.

The housing includes retainers in the form of cable cradles that contact the exterior surfaces of the cables and support them. In this manner, the diameter of the cables are increased adjacent the cable cradles. Thus, if a force is exerted on any of the cables, the additional layer of the particular cable will abut the cable cradle and prevent the cable from moving excessively out of the protective housing through the particular exit opening.

These and other objects, features and advantages of the Present Disclosure will be clearly understood through a consideration of the following detailed description.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1:
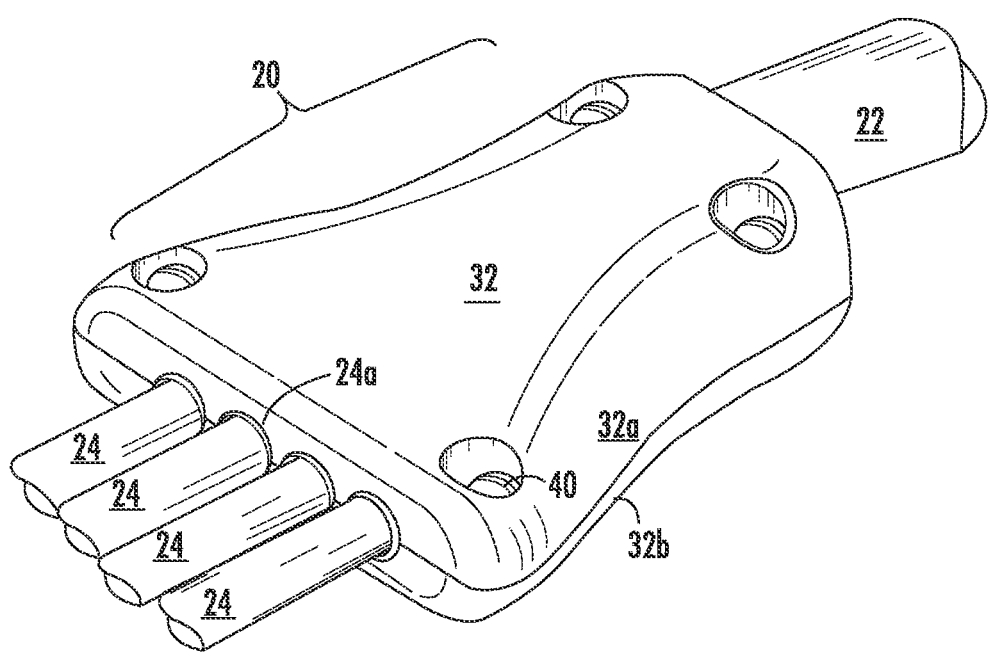
FIG. 1 illustrates a perspective view of a breakout assembly constructed in accordance with the principles of the Present Disclosure.

FIG. 1 illustrates a breakout assembly 20 constructed in accordance with the principles of the Present Disclosure that includes a large diameter trunk cable 22 that transitions into four separate, smaller diameter, breakout cables 24. The breakout assembly 20 holds the cables in place and limits their axial movement so that excessive strain, or stress, is not placed upon the cables during installation. In a preferred embodiment, each of the breakout cables 24 includes two pairs 25 of signal wires that are used to transmit signals between one electronic device and another such device. The wire pairs 25 are preferably arranged in parallel pairs, with each wire 25a of each wire pair 25 including a conductor 27a surrounded by an outer insulative covering 27b and the two wires of the pair wrapped with a conductive shielding member 27c. A drain wire 29 may be associated with each wire pair 25 and it may run between the wires of each wire pair 25. The two wire pairs 25 may further preferably be stacked upon each other and the two pairs 25 may then be surrounded with a conductive outer covering 29a such as a wire braid or the like. Only two sets of wire pairs 25 are shown exposed from one of the breakout cables 24 for clarity purposes.

Figure 2:
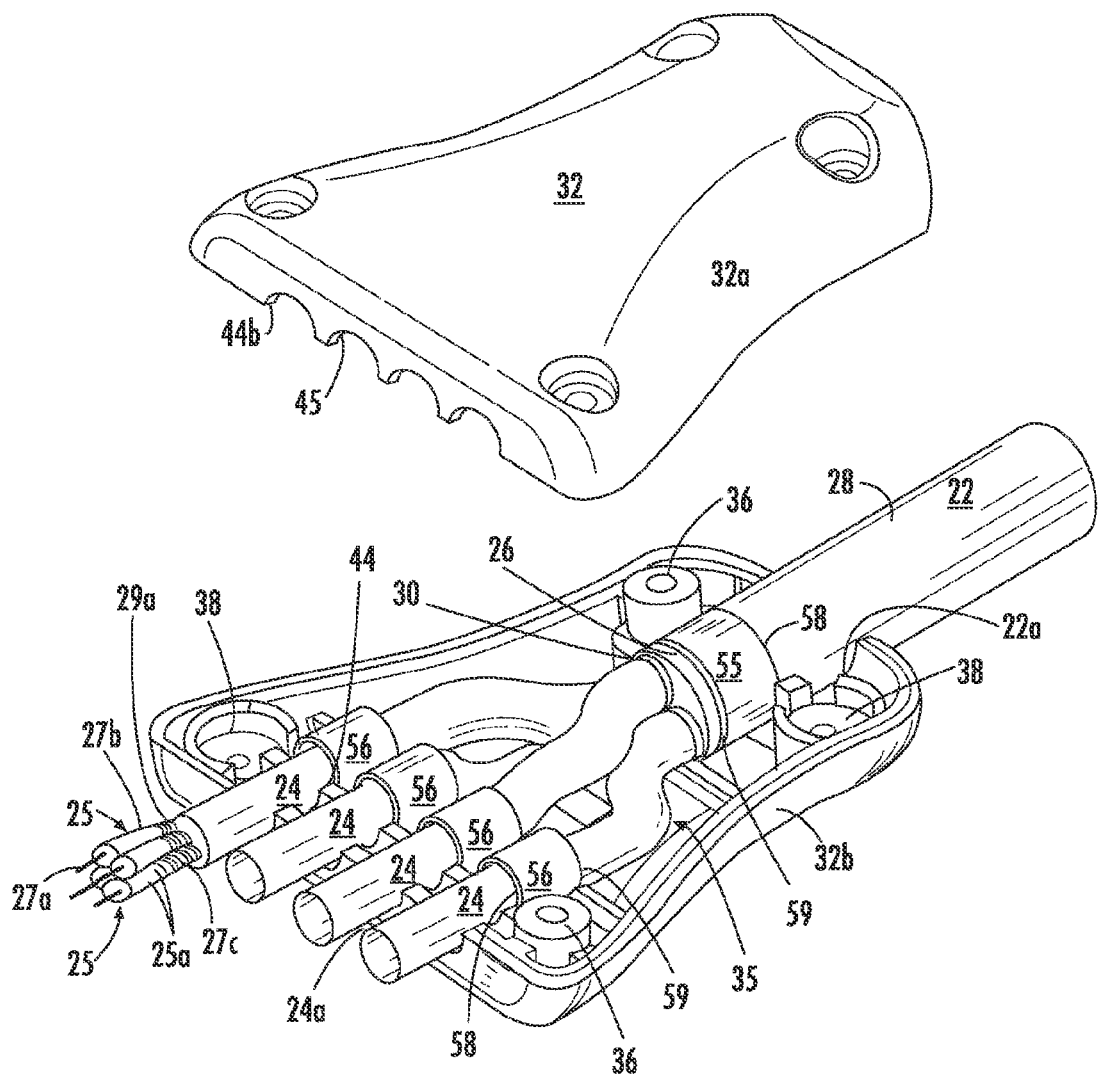
FIG. 2 is the same view as FIG. 1, with the top half of the housing removed for clarity.
Figure 5:
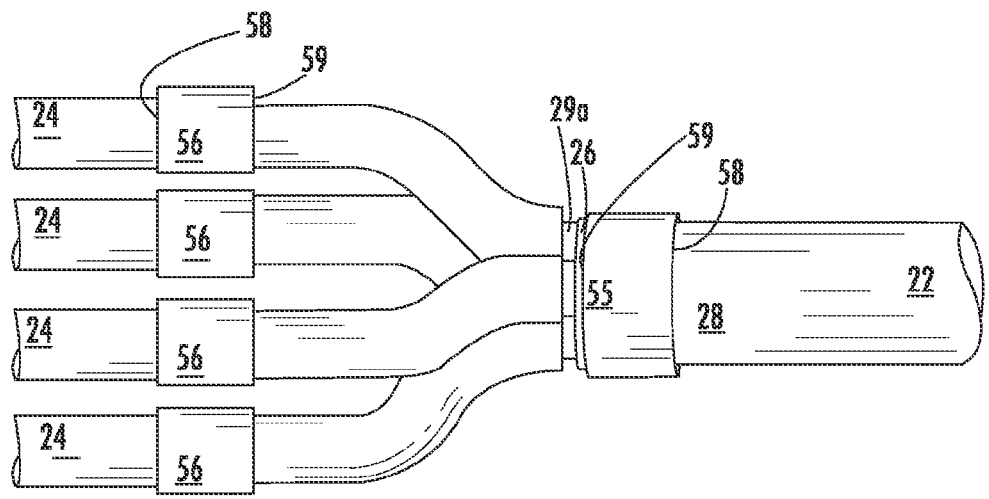
FIG. 5 is a top plan view of the cable breakout with the housing removed.
Figure 6:
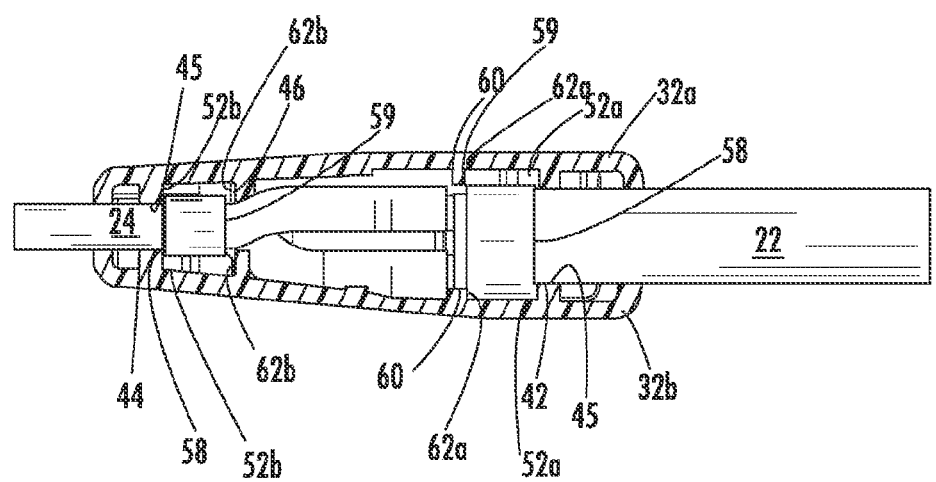
FIG. 6 is a sectional view of the breakout assembly of FIG. 1, taken along Line 6-6.

The trunk cable 22 typically includes a conductive shielding layer 26, such as a braid or a foil, that is wrapped around the breakout cables 24. An outer insulation layer 28 covers the conductive shielding layer 26 and serves to, among other things, protect the breakout cables 24 and the shielding layer 26. In order to assemble the breakout assembly 20, the outer cable insulation layer 28 is cut to expose the internal breakout cables 24 and define a free end 30 of the trunk cable 22. The shielding layer 26 is also trimmed back. The breakout cables 24 are arranged in a somewhat triangular or fan-like arrangement, such as that shown in FIGS. 2 and 5 and at least one of breakout cables crosses underneath another of the breakout cables.

An outer protective housing 32 is provided to enclose this transition, or exit area, and the trunk cable free end 30. The housing is preferably formed from two pieces, or halves 32a, 32b, which cooperatively define a hollow interior 35 of the housing 32. Two pieces is the most economical way to make the housing, but more pieces could be used. Alternatively, an encapsulant (e.g., hotmelt, epoxy, etc.) may be added to the hollow interior 35 of the housing 32 to make the assembly water resistant.

The housing preferably has a triangular configuration to accommodate the fan-like arrangement of the breakout cables 24 at the trunk cable free end 30. The housing 32 includes a large exit opening 22a at one end thereof, shown as a rear end in the Figures which defines a passage for the trunk cable 22. At another end thereof, a plurality of smaller exit openings 24a are provided, each of which defines a passage for a single breakout cable 24. The breakout cable exit openings 24a are spaced apart from each other in an lateral spacing so that they are preferably disposed in a common horizontal plane. The spacing between the breakout cables 24 may be linear or angular.

The hollow interior 35 of the housing 32 preferably includes interengaging bosses 36 and recesses 38 aligned with each other and which are configured to receive fasteners, such as screws 40 or the like. The housing 32 further includes a series of cable nests, or cradles 42, 44, disposed in the hollow interior 35 and formed on each of the housing pieces. The cable cradles 42, 44 are preferably disposed within the housing interior 35 and spaced inwardly of the exit openings 22a, 24a. One of the cable cradles 42 contacts and preferably supports the trunk cable and the other cable cradle 44 contacts and support the four breakout cables 24. In this regard, the cable cradles 42, 44 have generally semi-circular depressions 45 associated with them that contact the exterior surfaces of the cables 22, 24.

A spreader bar 46 may be provided as further support for the breakout cables 24 and may include one or more posts 48 that extend into the hollow interior 35 to define four cable-receiving channels 50 in the housing which may assist in the assembly process. Preferably, the configuration of the cable cradles 42, 44 in the two housing pieces 32a, 32b are mirror images of each other, such that when the two housing halves 33 and 34 are assembled together, the cables cradles 42, 44 in both of the halves substantially contact the exterior surfaces of the cables 22, 24 throughout their entire circumference, with an allowance for fitting tolerances. Depending on manufacturing tolerances, the cable cradles 42, 44 may contact the entire circumference of the cables 22, 24, or they may contact substantially all of the circumference. The important feature of the contact length of the cable cradles is that they define a sufficient circumferential extent that provides the stop surfaces to engage the cable stop members as described below.

Figure 3:
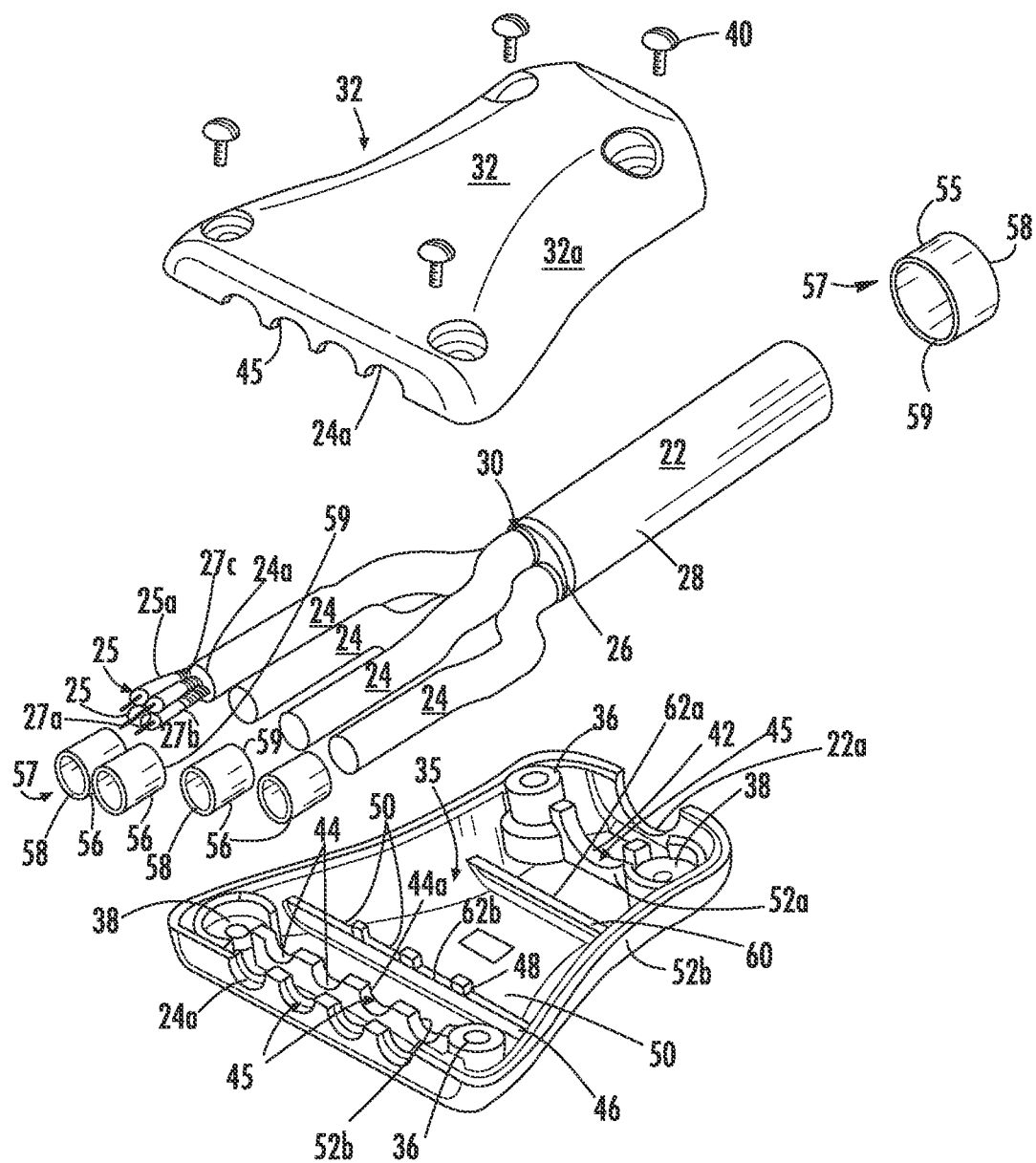
FIG. 3 is an exploded view of the breakout assembly of FIG. 1.

The cable cradles 42, 44 both include respective first stop surfaces 52a, 52b along their interior faces 53, 54. These stop surfaces 52a, 52b extend at an angle to the cables 22, 24 and are illustrated as extending transversely to the cables 42, 44. In order to provide a way of capturing the cable transition (or breakout) area and retaining it in place within the housing, the cables 22, 24 are provided with stop members 55, 56 along their outer exterior surfaces that increase the outer diameters of the cables and present confronting edges, extending preferably around the entire outer circumference thereof, as best shown in FIG. 3. These stop members 55, 56 are illustrated in the preferred embodiment as lengths of tubing 57, preferably a heat shrink tubing, and most preferably, an adhesive-backed heat shrink tubing.

These pieces of tubing 57 are slipped over their respective trunk and breakout cables and shrunk down tightly onto the exterior surfaces of the cables. As such, the stop members increase the diameter of the cables to which they are applied. The adhesive assists in keeping them in place on the cables so that their outermost edges 58 confront the inner-facing stop surfaces 52a, 52b of the cable cradles 42, 44. In this manner, the cable transition is captured in the housing 32 and movement of the cables 22, 24 during connection or disconnection will not result in pulling the cables excessively out of the housing 32 to impart stress or strain to the cable transition. Other members, such as rings and the like, may be applied to the cable exterior surfaces so long as they increase the diameter of the cable to define confronting edges that will contact the cable cradle stop surfaces 52a, 52b in response to movement of the cables 22, 24.

Each stop member 55, 56 is applied to a single cable 22, 24 so that each cable within the hollow interior 35 of the housing 32 is given an ability to contact the opposing, inner stop surfaces 52a, 52b of the respective cable cradles 42, 44 and thereby resist excessive movement of the cables 22, 24 out of the housing 32. This protects the cable transition area from imposition of stresses or strain during use of the cables, such as connection and disconnection of the breakout cables from an SFP connector-equipped device. In this regard, it is desirable to have the cable cradle stop surfaces present a sufficient amount of confronting surface to effectively engage the opposing edges of the cable stop members.

Figure 4:
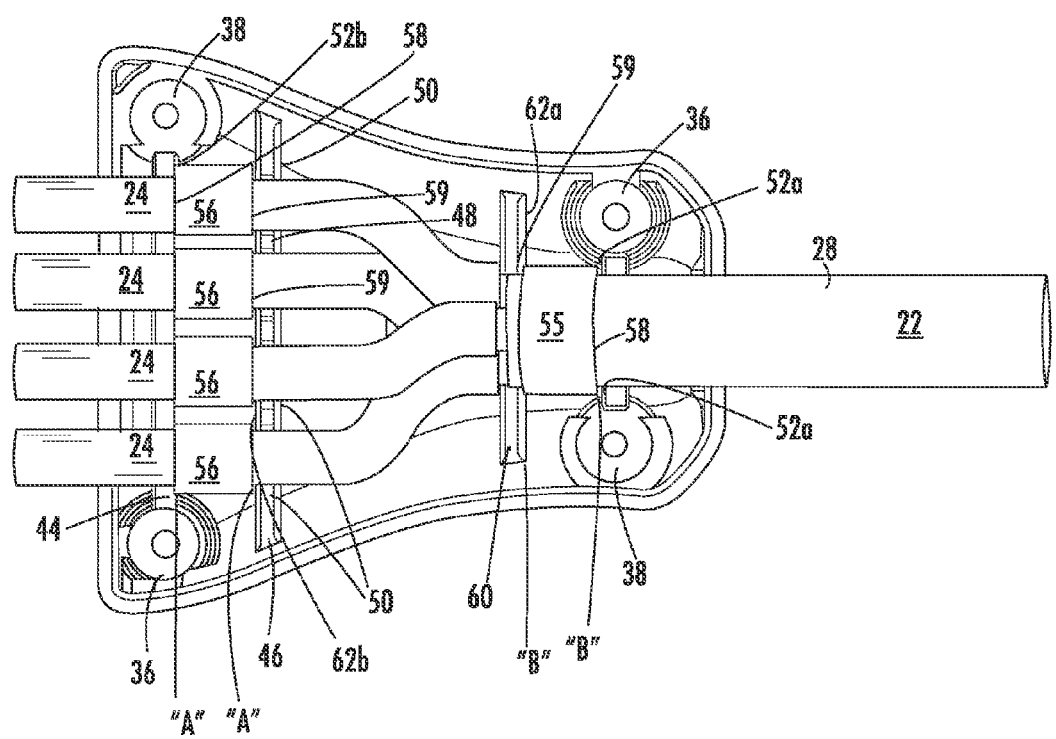
FIG. 4 is a top plan view of the bottom half of the breakout assembly of FIG. 1.

The spreader bar 46 is also preferably positioned proximate to the other, innermost edges 59 of the stop members 56, and a support bar 60 is provided in the housing upon which the trunk cable rests, proximate to the inner edge 59 of the trunk cable stop member 55. As such, these two additional components define second stop surfaces 62*a*, 62*b* in opposition to the first stop surfaces 52*a*, 52*b* and to the innermost edges 59 (FIG. 3) of the stop members 56. Thus the stop members 55, 56 on the trunk and the breakout cables 22, 24 are captured, in essence, between the first and second stop surfaces to resist pulling movement on the cables from either end of the housing. This is shown diagrammatically in FIG. 4, where "A" represents the stop surfaces that resist pulling on the breakout cables and where "B" represents the stop surfaces that resist pulling on the trunk cable.

While a preferred embodiment of the Present Disclosure is shown and described, it is envisioned that those skilled in the art may devise various modifications without departing from the spirit and scope of the foregoing Description and the appended Claims.

What is claimed is:

1. A cable transition structure comprising, in combination:
   a trunk cable, the trunk cable including an outer insulative covering that defines a hollow passage extending axially for a predetermined length of the trunk cable, the trunk cable having a preselected outer diameter;
   a plurality of breakout cables extending axially within the passage, each of the breakout cables having an associated outer insulative covering with a preselected outer diameter, the breakout cables exiting from the hollow passage at a transition area, and the trunk cable diameter being different from the breakout cable diameters, the trunk cable having a free end at which the breakout cables exit therefrom; and
   a housing including a first half and a second half that cooperatively define a hollow interior space for enclosing the trunk cable free end and portions of the breakout cables proximate to the trunk cable free end, the housing having a first exit passage for receiving the trunk cable therein and a plurality of second exit passages for respectively receiving the breakout cables therein, and the trunk and breakout cables including stop members disposed on their exterior surfaces with the outer insulative coverings that oppose confronting surfaces of the housing proximate to the housing first and second ends, wherein the housing includes first and second cable cradles, the first cable cradle contacting the exterior of the trunk cable and the second cable cradles contacting respective ones of the breakout cables, the second cable cradle positioned internal to the housing so that the second cable cradle is spaced apart from the second exit passages, wherein the first and second cable cradles each include first stop surfaces extending at angles to the trunk and breakout cables in confronting relationship to the cable stop members, and wherein the stop members include lengths of tubing disposed on the exterior surfaces of the trunk and breakout cables.

2. The cable transition structure of claim 1, wherein the trunk and breakout cables have a generally circular cross-section and the first and second cable cradles have a general semi-circular cross section.

3. The cable transition structure of claim 1, wherein the tubing lengths includes lengths of adhesive-backed, heat-shrink tubing.

4. The cable transition structure of claim 3, wherein the cable cradles arrange the breakout cables in a fan-like arrangement and the housing has a generally triangular configuration.

5. The cable transition structure of claim 1, wherein the trunk and breakout cables stop members have different diameters.

6. The cable transition structure of claim 1, wherein the stop members increase the diameters of the trunk and breakout cables proximate to the stop surfaces and the cable cradles have a diameter less than the trunk and breakout cable increased diameters.

7. The cable transition structure of claim 1, wherein the housing includes second stop surfaces spaced apart from the first stop surfaces and the tubing lengths are disposed in the housing between the first and second stop surfaces.

8. A cable breakout, comprising:
   a trunk cable of a first diameter with an insulative covering that at least defines in part, a hollow passage extending lengthwise therethrough between first and second ends of the trunk cable;
   a plurality of breakout cables extending lengthwise within the hollow passage, each of the breakout cables having a second diameter that is different from the first diameter, and each of the breakout cables extending past a first end of the trunk cable to transition from a single, large trunk cable to a plurality of smaller breakout cables;
   a housing including at least first and second halves that cooperatively define a hollow interior, the hollow interior including first and second cable cradles that respectively contact exterior surfaces of the trunk and breakout cables, the first and second cable cradles including first stop surfaces, wherein the second cable cradles is positioned adjacent to and spaced apart from a housing exit configured to accept the breakout cables; and
   areas of increased diameter disposed on the trunk and breakout cables exterior surfaces defining stop members for confronting the first stop surfaces;
   wherein the trunk and breakout cable stop members contact the first stop surfaces to resist the cables moving excessively out of the housing during use of the multiwire cable.

9. The multiwire cable of claim 8, wherein the cable stop members are defined by first and second lengths of tubing applied respectively to the exterior surfaces of the trunk and breakout cables, the first and second lengths of tubing including first edges disposed in opposition, respectively, to the first and second cradle stop surfaces.

10. The multiwire cable of claim 9, wherein the housing further includes second additional stop surfaces spaced lengthwise apart from the first stop surfaces, and the first and second lengths of tubing further including first and second edges disposed in opposition, respectively, to the first and second stop surfaces.

11. The multiwire cable of claim 9, wherein the first and second lengths of tubing are heat-shrink tubing.

12. The multiwire cable of claim 11, wherein the first and second tubing lengths are adhered to the trunk and breakout cable exterior surfaces.

13. The multiwire cable of claim 8, wherein the cable cradles contact substantially the entire circumference of the exterior surface of the cables.

14. The multiwire cable of claim 8, wherein the breakout cables are arranged in a fan-like arrangement such that the breakout cables are angularly spaced apart from each other in a horizontal plane of the housing, and the housing having a triangular configuration that encloses the fan-like arrangement.

15. A cable transition structure comprising:
- a trunk cable with an outer covering with a first preselected outer diameter, the trunk cable containing a plurality of breakout cables which extend axially within the trunk cable, each of the breakout cables having an outer covering with a second outer diameter, the breakout cables exiting from the trunk cable at an end thereof which defines a cable transition area of the trunk cable, the first and second outer diameters being different; and
- a housing having at least two halves that cooperatively define a hollow interior space for enclosing the cable transition area, the housing having a first exit passage disposed at one end thereof that accommodates the trunk cable therein, and a plurality of second exit passages disposed at another end thereof that accommodate the breakout cables therein, and the housing further including first and second cable cradles that contact exterior surfaces of the trunk and breakout cables, the first and second cable cradles including first stop surfaces disposed at angles to the trunk and breakout cables, and the trunk and breakout cables including stop members on their exterior surfaces which increase the first and second diameters to thereby define edges that confront the first stop surfaces, wherein the second cable cradle is spaced apart from the second exit passages.

16. The cable transition structure of claim 15, wherein the housing further includes second stop surfaces spaced apart from the first stop surfaces and in opposition thereto, and the stop members having lengths sufficient to fit between and in confronting relationship, the first and second stop surfaces.

* * * * *